United States Patent
Akimoto

(10) Patent No.: US 9,980,093 B1
(45) Date of Patent: May 22, 2018

(54) MOBILE TERMINAL DEVICE AND SAFETY MANAGEMENT SYSTEM

(71) Applicant: KYOCERA Document Solutions Inc., Osaka (JP)

(72) Inventor: Tadaaki Akimoto, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days. days.

(21) Appl. No.: 15/845,483

(22) Filed: Dec. 18, 2017

(30) Foreign Application Priority Data

Jan. 11, 2017 (JP) ................................ 2017-002656

(51) Int. Cl.
| | |
|---|---|
| *H04W 24/00* | (2009.01) |
| *H04W 4/02* | (2018.01) |
| *G09G 5/10* | (2006.01) |
| *G09G 5/12* | (2006.01) |

(52) U.S. Cl.
CPC ............ *H04W 4/023* (2013.01); *G09G 5/10* (2013.01); *G09G 5/12* (2013.01); *G09G 2320/0626* (2013.01); *G09G 2320/08* (2013.01); *G09G 2354/00* (2013.01)

(58) Field of Classification Search
CPC ......... H04W 4/023; H04W 4/02; H04W 4/90; H04W 4/029; H04W 4/08; H04W 4/025; H04W 4/026; H04W 64/00; H04W 64/006; H04W 4/043; H04W 4/80; H04W 88/02; H04W 4/021; H04W 4/38
USPC ............ 455/418, 456.3, 456.6, 456.1, 404.2, 455/414.1, 466, 550.1, 557, 566
See application file for complete search history.

(56) References Cited

U.S. PATENT DOCUMENTS

| | | | | |
|---|---|---|---|---|
| 2013/0162611 A1* | 6/2013 | Lim | ........................ | G09G 5/003 345/207 |
| 2013/0341650 A1* | 12/2013 | Peng | ........................ | H01L 23/31 257/82 |
| 2015/0097789 A1* | 4/2015 | Hsu | ........................ | G01N 21/94 345/173 |
| 2018/0018024 A1* | 1/2018 | Park | ........................ | G06F 3/0304 |

FOREIGN PATENT DOCUMENTS

| | | |
|---|---|---|
| JP | 2015-088860 A | 5/2015 |
| JP | 2016-095799 A | 5/2016 |

* cited by examiner

*Primary Examiner* — Fred Casca
(74) *Attorney, Agent, or Firm* — IP Business Solutions, LLC

(57) ABSTRACT

A mobile terminal device includes a display unit, an operation unit, a position detection unit, a communication unit, and a controller. The operation unit is operated by a user. The position detection unit detects a position of the mobile terminal device. The communication unit makes communication with another mobile terminal device. The controller decides whether the another mobile terminal device is approaching the mobile terminal device on a basis of a position of the another mobile terminal device received by the communication unit, and the position of the mobile terminal device detected by the position detection unit, and darkens a part or whole of a screen of the display unit, upon deciding that the another mobile terminal device is approaching.

12 Claims, 7 Drawing Sheets

MOBILE TERMINAL DEVICE AND SAFETY MANAGEMENT SYSTEM

INCORPORATION BY REFERENCE

This application claims priority to Japanese Patent Application No. 2017-002656 filed on Jan. 11, 2017, the entire contents of which are incorporated by reference herein.

BACKGROUND

The present disclosure relates to a portable-type mobile terminal device and a safety management system, and more particularly to a technique to secure safety for a user moving while operating the mobile terminal device.

Recently, accidents originating from moving while operating a mobile terminal device such as a smartphone have been raised as an issue. Accordingly, a technique to decide that the user has started to operate the terminal device while walking, when the moving speed of the terminal device has remained higher than a certain level for a predetermined period of time, and to automatically display a warning to the user on the display unit of the terminal device (hereinafter, first technique), has been proposed.

In addition, a technique to acquire position information of pedestrians and vehicles such as bicycles, motorcycles, and wheelchairs at an intersection, and to display the position information on the display unit of the terminal device (hereinafter, second technique), has been proposed, to reduce the occurrence frequency of traffic accidents.

SUMMARY

The disclosure proposes further improvement of the foregoing technique.

In an aspect, the disclosure provides a mobile terminal device including a display unit, an operation unit, a position detection unit, a communication unit, and a controller.

The operation unit is operated by a user.

The position detection unit detects a position of the mobile terminal device.

The communication unit makes communication with another mobile terminal device.

The controller decides whether the another mobile terminal device is approaching the mobile terminal device on a basis of a position of the another mobile terminal device received by the communication unit, and the position of the mobile terminal device detected by the position detection unit, and darkens a part or whole of a screen of the display unit, upon deciding that the another mobile terminal device is approaching.

In another aspect, the disclosure provides a safety management system including a plurality of mobile terminal devices and a management apparatus.

The management apparatus makes communication with each of the plurality of mobile terminal devices.

The management apparatus acquires, from each of the mobile terminal devices, a position of the corresponding mobile terminal device, and transmits the position to each of the mobile terminal devices.

The mobile terminal devices each include:
a display unit,
an operation unit to be operated by a user,
a position detection unit that detects an own position of the mobile terminal device,
a communication unit that makes communication with another mobile terminal device, and
a controller that decides whether the another mobile terminal device is approaching the mobile terminal device on a basis of a position of the another mobile terminal device received by the communication unit, and the position of the mobile terminal device detected by the position detection unit, and darkens a part or whole of a screen of the display unit, upon deciding that the another mobile terminal device is approaching.

DETAILED DESCRIPTION

Hereafter, a mobile terminal device and a safety management system according to embodiments of the disclosure will be described with reference to the drawings.

Figure 1:
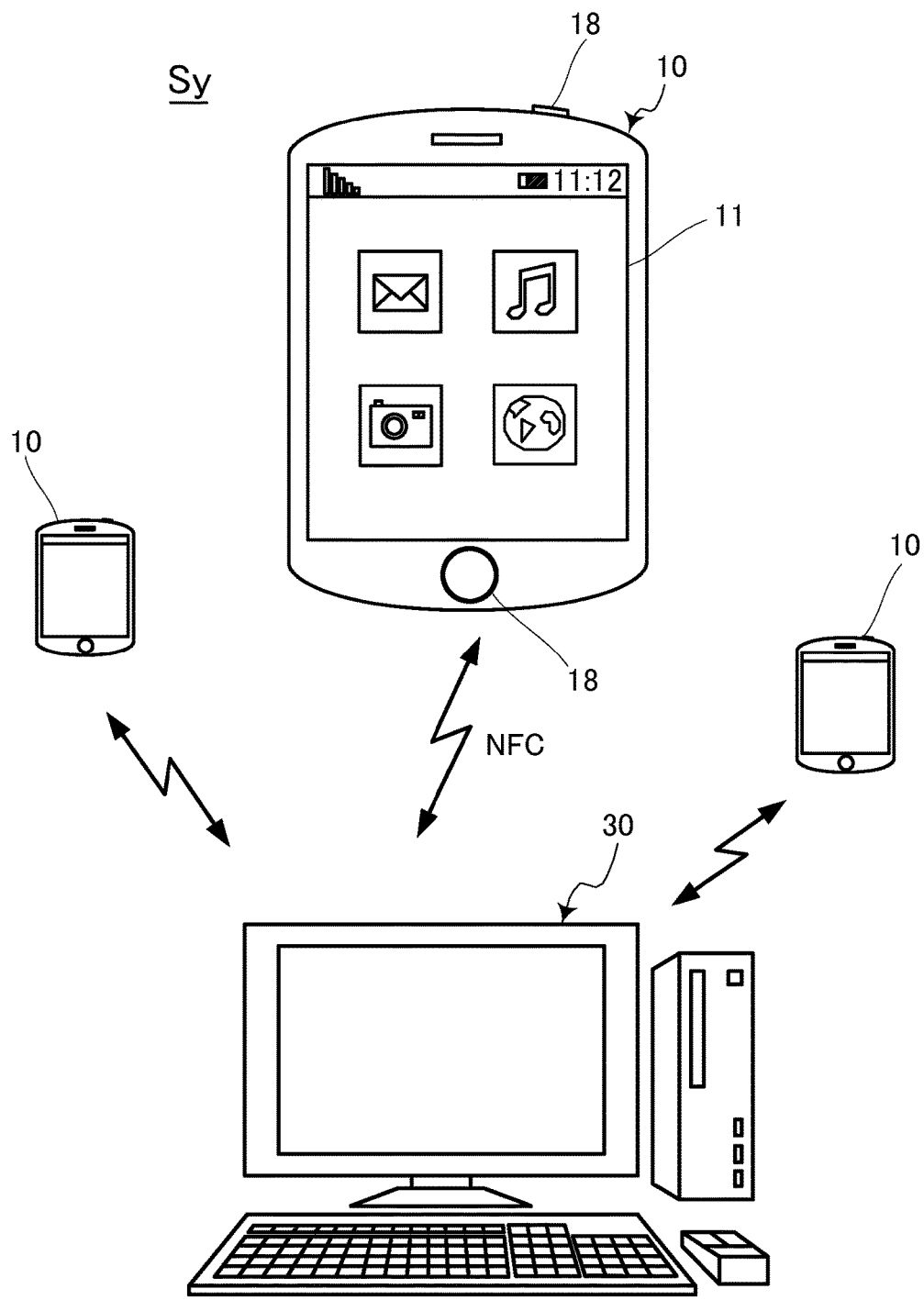
FIG. 1 is a schematic drawing showing a safety management system according to a first embodiment of the disclosure.
Figure 2:
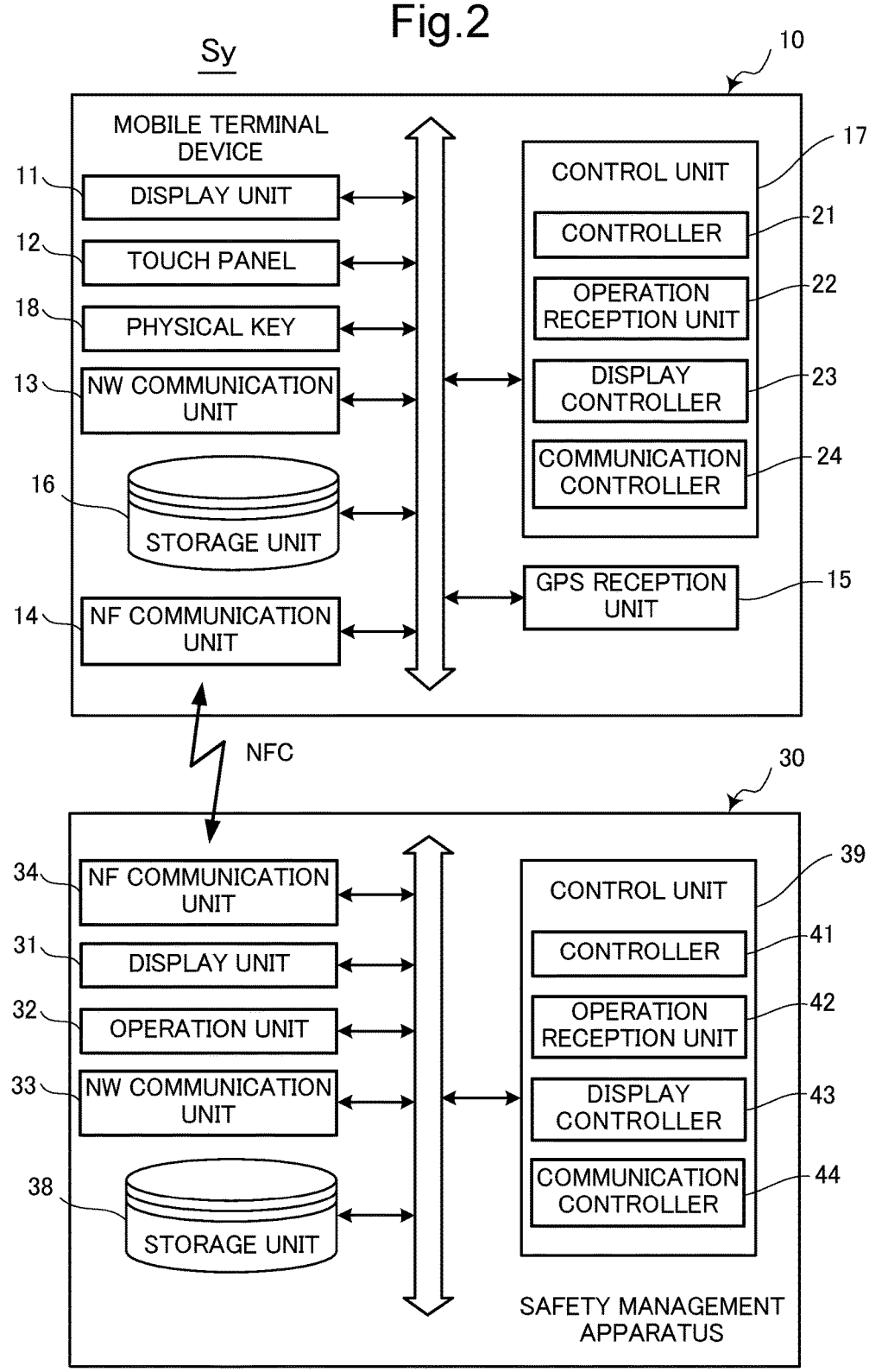
FIG. 2 is a block diagram showing a configuration of a mobile terminal device, and a management apparatus of the safety management system according to the first embodiment.

The embodiments of the disclosure will be described hereunder, with reference to the drawings. FIG. 1 is a schematic drawing showing the safety management system according to a first embodiment of the disclosure. FIG. 2 is a block diagram showing a configuration of the mobile terminal device, and a management apparatus of the safety management system according to the first embodiment In the safety management system Sy according to this embodiment, data communication based on a near-field communication, for example Wi-Fi data communication, is performed between a plurality of mobile terminal devices 10 and a management apparatus 30, to prevent the users of the respective mobile terminal devices 10 from bumping each other, in the wireless communication area around the management apparatus 30.

The mobile terminal device 10 in the safety management system Sy is for example a smartphone or a mobile apparatus, and includes a display unit 11, a touch panel 12, a physical key (e.g., start key) 18, a network communication unit 13, a near-field communication unit 14, a GPS reception unit 15, a storage unit 16, and a control unit 17. The mentioned components are configured to transmit and receive data or signals to and from each other, via a bus.

The display unit 11 is constituted of a liquid crystal display (LCD), an organic light-emitting diode (OLED), or the like. On the screen of the display unit 11, for example a plurality of icons are displayed.

The touch panel 12 is based on what is known as a resistive film or electrostatic capacitance. The touch panel 12 is provided in the screen of the display unit 11, to detect a contact of a finger to the icon on the screen of the display unit 11, as well as the position of the contact. Upon detecting a contact of a finger, the touch panel 12 outputs a detection signal indicating a coordinate of the contact position to an operation reception unit 22 of the control unit 17, which will be subsequently described. Thus, the touch panel 12 serves as an operation unit by which the user's operation is inputted through the screen of the display unit 11.

The mobile terminal device 10 also includes the physical key 18, as the operation unit for inputting the user's operation, in addition to the touch panel 12.

The network communication unit 13 (denoted as NW communication unit in FIG. 2) is a communication interface including a communication module such as a non-illustrated LAN chip. The network communication unit 13 is connected to other mobile terminal devices via a network such as a public telephone network, to allow the mobile terminal device 10 to make wireless calls through the network communication unit 13.

The near-field communication unit 14 (denoted as NF communication unit in FIG. 2) is a communication interface, for example based on Wi-Fi or Bluetooth (registered trademark) standard. The mobile terminal device 10 is connected to the management apparatus 30 via the near-field communication unit 14, to transmit and receive data to and from the management apparatus 30.

The GPS reception unit 15 receives GPS signals respectively transmitted from a plurality of global positioning system (GPS) satellites, and outputs the signals to the control unit 17. The GPS signal includes information of the position of the GPS satellite that is the source of the corresponding GPS signal, and the transmission time. The controller 21 can calculate the position of the mobile terminal device 10, on the basis of the information of the position and the transmission time in the GPS signal.

The storage unit 16 is a storage device such as a random-access memory (RAM) or a hard disk drive (HDD).

The control unit 17 includes a processor, a random-access memory (RAM), a read-only memory (ROM), and so forth. The processor is constituted of, for example, a central processing unit (CPU), an ASIC, or an MCU. The control unit 17 acts as the controller 21, the operation reception unit 22, the display controller 23, and the communication controller 24, when the processor executes a control program stored in the ROM or the storage unit 16. Here, the above-cited components of the control unit 17 may each be constituted of a hardware circuit, instead of being realized by the operation based on the control program.

The control unit 17 is connected to the display unit 11, the touch panel 12, the physical key 18, the network communication unit 13, the near-field communication unit 14, the GPS reception unit 15, and the storage unit 16, to control the mentioned units, and transmit and receive data or signals to and from these units.

The operation reception unit 22 identifies the operation inputted by the user, on the basis of the detection signal outputted from the touch panel 12 or an operation of the physical key 18. The operation reception unit 22 then receives the user's operation identified, and outputs a control signal corresponding to the user's operation to the controller 21, the display controller 23, and the communication controller 24.

The controller 21 integrally controls the mobile terminal device 10. The controller 21 also acts as a processing unit to execute the process corresponding to the operation received by the operation reception unit 22. For example, when the user selects, through the touch panel 12, an icon displayed on the screen of the display unit 11, and the operation reception unit 22 receives the user's operation made on the icon, the controller 21 executes the function associated with the icon.

Further, the controller 21 receives the GPS signals of the respective GPS satellites from the GPS reception unit 15, and calculates the position of the mobile terminal device 10, on the basis of the information of the position of the GPS satellite and the transmission time, indicated by the GPS signal.

The communication controller 24 is configured to control the communication operation of the network communication unit 13 and the near-field communication unit 14. The storage unit 16 contains various application programs and various types of information. The display controller 23 is configured to control the display operation of the display unit 11. Here, the controller 21, the operation reception unit 22, the display controller 23, and the communication controller 24 constitute the "controller" in the disclosure.

The management apparatus 30 of the safety management system Sy will now be described hereunder. The management apparatus 30 of the safety management system Sy is, for example, a computer or a work station, and includes a display unit 31, an operation unit 32, a network communication unit 33, a near-field communication unit 34, a storage unit 38, and a control unit 39. The mentioned components are configured to transmit and receive data or signals to and from each other, via a bus.

The control unit 39 includes a CPU, a RAM, a ROM, and so forth, and acts as a controller 41, an operation reception unit 42, a display controller 43, and a communication controller 44. The controller 41 integrally controls the management apparatus 30.

The control unit 39 includes a processor, a random-access memory (RAM), a read-only memory (ROM), and so forth. The processor is constituted of, for example, a central processing unit (CPU), an ASIC, or an MCU. The control unit 39 acts as the controller 41, the operation reception unit 42, the display controller 43, and the communication controller 44, when the processor executes an operation control program stored in the ROM or the storage unit 38. Here, the above-cited components of the control unit 39 may each be constituted of a hardware circuit, instead of being realized by the operation based on the operation control program.

The operation unit 32 includes a keyboard and a mouse to be operated by the user, and the instruction corresponding to the operation is received by the operation reception unit 42.

The display unit 31 is controlled by the display controller 43 so as to display a screen for executing an application program, a screen for inputting information, and so forth.

The network communication unit 33 (denoted as NW communication unit in FIG. 2) is a communication interface including a communication module such as a non-illustrated LAN chip. The network communication unit 33 is connected to a server via a network such as a public telephone network, to allow the management apparatus 30 to make data communication through the network communication unit 33.

The near-field communication unit 34 (denoted as NF communication unit in FIG. 2) is a communication interface, for example based on Wi-Fi or Bluetooth (registered trademark) standard. The near-field communication unit 34 transmits and receives data to and from the mobile terminal device 10, for example through Wi-Fi communication.

The storage unit 38 contains various application programs and various types of information.

In the safety management system Sy configured as above, the management apparatus 30 performs data communication with each of the mobile terminal devices 10 through Wi-Fi communication, to collect the positions of the respective mobile terminal devices 10, and transmits the positions of the mobile terminal devices 10 to each of the mobile terminal devices 10.

The mobile terminal devices 10 each detect the own position, and transmit the position to the management apparatus 30. At the same time, the mobile terminal devices 10 each receive the positions of other mobile terminal devices 10 from the management apparatus 30, and decide whether the mobile terminal device 10 itself is moving, on the basis of a change of the own position.

When one of the mobile terminal devices 10 (hereinafter, first mobile terminal devices 10) decides that itself is moving, the first mobile terminal device 10 compares the position of itself and the position of another mobile terminal device 10 (hereinafter, second mobile terminal devices 10), to thereby decide whether the second mobile terminal device 10 is approaching itself. Upon deciding that the second mobile terminal device 10 is approaching, the first mobile terminal device 10 darkens a part or the whole of the screen of the display unit 11. At this point, the first mobile terminal device 10 calculates a separation distance between itself and the second mobile terminal device 10, on the basis of the position of itself and the position of the second mobile terminal device 10, and expands the darkened portion on the screen of the display unit 11, as the separation distance becomes shorter. In addition, the first mobile terminal device 10 identifies the approaching direction of the second mobile terminal device 10, on the basis of the position of itself and the position of the second mobile terminal device 10, and darkens the screen of the display unit 11, from the portion corresponding to the approaching direction.

Figure 3:
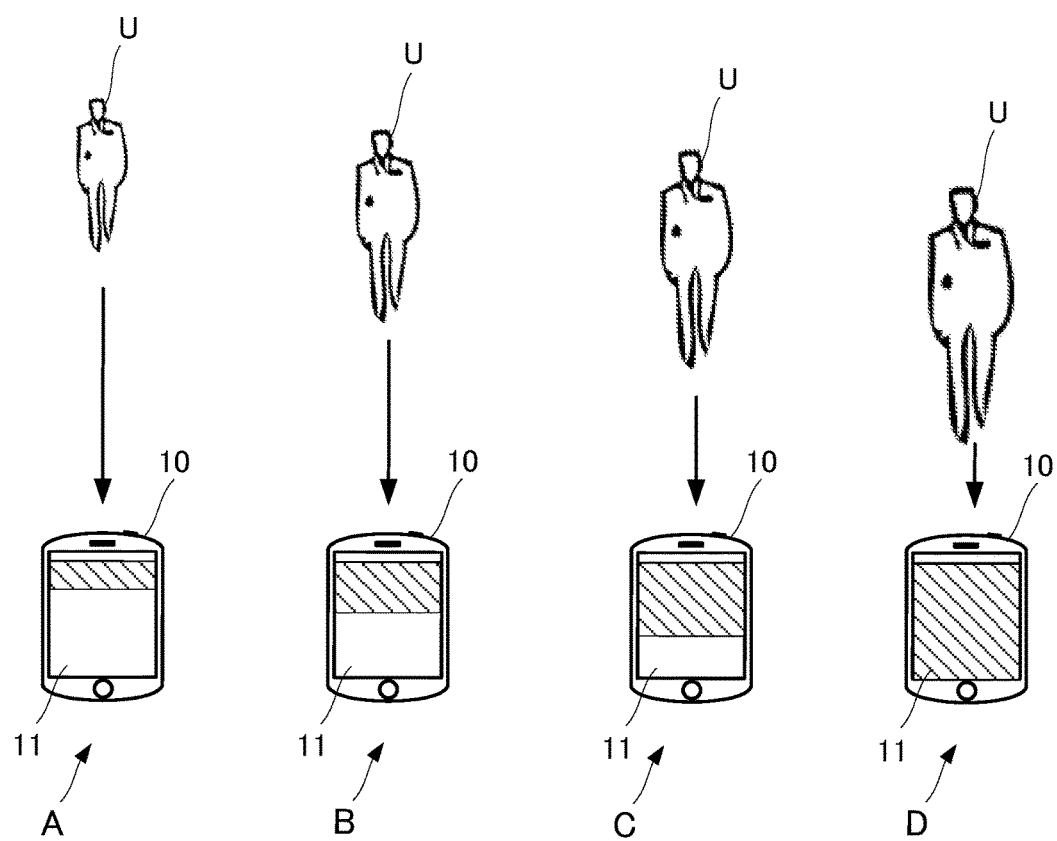
FIG. 3 is a schematic drawing representing changes sequentially made on a screen of a display unit of the mobile terminal device when another mobile terminal device is approaching from forward.

For example, when the user U of the second mobile terminal device 10 is approaching the first mobile terminal device 10 from forward, as shown in FIG. 3, while the first mobile terminal device 10 is moving, the first mobile terminal device 10 darkens the screen of the display unit 11 of itself from the upper portion of the screen, and expands the darkened portion on the screen as the second mobile terminal device 10 comes closer to itself, until finally the entirety of the screen is darkened. Likewise, when the user U of the second mobile terminal device 10 is approaching the first mobile terminal device 10 from behind, the first mobile terminal device 10 darkens the screen of the display unit 11 of itself from the lower portion of the screen, and expands the darkened portion on the screen as the second mobile terminal device 10 comes closer to itself.

Figure 4:
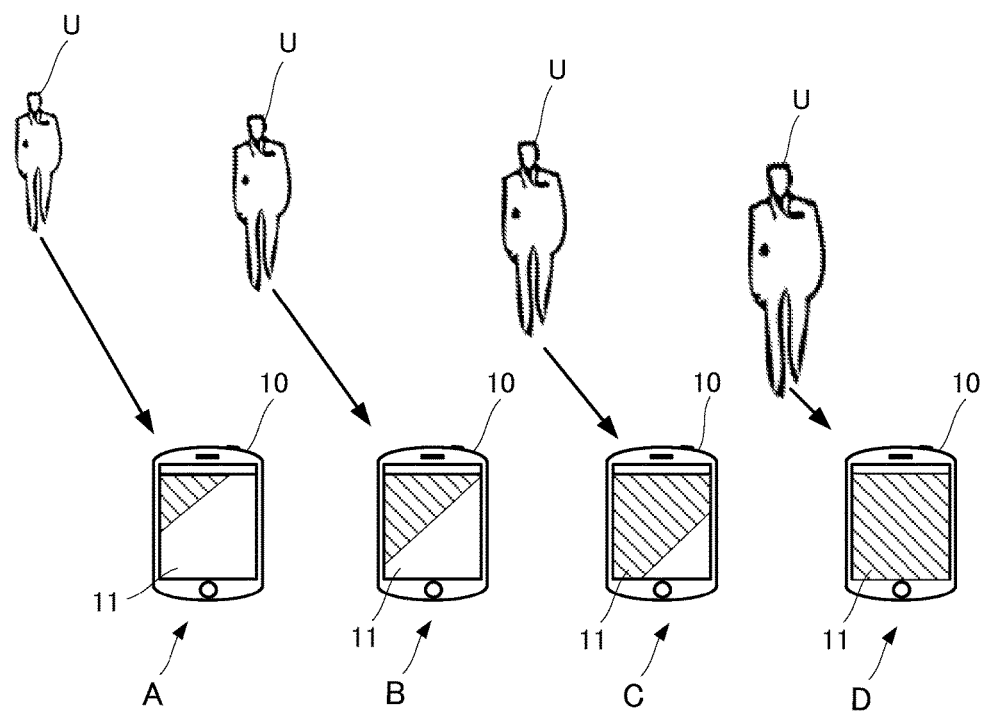
FIG. 4 is a schematic drawing representing changes sequentially made on the screen of the display unit of the mobile terminal device when another mobile terminal device is approaching from forward and diagonally from the left.

When the user U of the second mobile terminal device 10 is approaching the first mobile terminal device 10 from forward and diagonally from the left, as shown in FIG. 4, the first mobile terminal device 10 darkens the screen of the display unit 11 of itself from a diagonally upper left portion of the screen, and expands the darkened portion on the screen as the second mobile terminal device 10 comes closer to itself, until finally the entirety of the screen is darkened. Likewise, when the user U of the second mobile terminal device 10 is approaching the first mobile terminal device 10 from behind and diagonally from the right, the first mobile terminal device 10 darkens the screen of the display unit 11 of itself from a diagonally lower right portion of the screen, and expands the darkened portion on the screen as the second mobile terminal device 10 comes closer to itself.

Thus, the user of the first mobile terminal device 10 can be aware, even when operating the mobile terminal device watching the screen of the display unit 11 while moving, that the second mobile terminal device 10 is approaching, with the separation distance from the second mobile terminal device 10 and the approaching direction thereof, and thus led to suspend the operation of the first mobile terminal device 10. Therefore, the user of the first mobile terminal device 10 can be prevented from bumping the user U of the second mobile terminal device 10. In the case where no other mobile terminal device 10 is approaching, the user of the first mobile terminal device 10 can operate the mobile terminal device while moving.

Referring now to the flowchart shown in FIG. 5, description will be given about a process of darkening the screen of the display unit 11 of the first mobile terminal device 10, when the second mobile terminal device 10 is approaching.

First, it will be assumed that the management apparatus 30 has established a public access point for the Wi-Fi communication. When the mobile terminal device 10 enters the area of the Wi-Fi communication of the management apparatus 30, the Wi-Fi communication is started between the near-field communication unit 34 of the management apparatus 30 and the near-field communication unit 14 of the mobile terminal device 10, according to a predetermined protocol (S101). Thereafter, the application program corresponding to the process of S102 to S108 is activated and executed on the side of the mobile terminal device 10, and operations for responding the operation of the mobile terminal device 10 are executed, on the side of the management apparatus 30.

When the Wi-Fi communication with the mobile terminal device 10 is started, the communication controller 44 of the management apparatus 30 transmits a request for transmission of the position of the mobile terminal device 10, to the mobile terminal device 10 through the near-field communication unit 34.

In the mobile terminal device 10, the near-field communication unit 14 receives the request for transmission of the position, and outputs the transmission request to the controller 21 (S102). The controller 21 activates the GPS reception unit 15 in response to the position transmission request, to receive a GPS signal from the GPS reception unit 15, and acquires the position of the mobile terminal device 10. The communication controller 24 transmits the position to the management apparatus 30 through the near-field communication unit 34, together with the identifier of the mobile terminal device 10 (e.g., media access control address) (S103). As long as the mobile terminal device 10 is within the communication area of the management apparatus 30, the position of the mobile terminal device 10 is periodically acquired and transmitted to the management apparatus 30.

The management apparatus 30 receives the respective positions of all the mobile terminal devices 10 located within the communication area of the management apparatus 30, through the near-field communication unit 34, and thus collects the positions of all the mobile terminal devices 10 in the communication area. To be more detailed, the management apparatus 30 receives the positions of all the mobile terminal devices 10 together with the respective identifiers, and stores the positions of all the mobile terminal devices 10 in the storage unit 38, in association with the corresponding identifiers. Then the controller 41 searches, each time the position of a given mobile terminal device 10, or a first mobile terminal device 10, is received, the position of other mobile terminal devices 10, corresponding to the identifiers different from that of the first mobile terminal device 10, in the storage unit 38. The communication controller 44 transmits the positions of other mobile terminal devices 10 to the first mobile terminal device 10, through the near-field communication unit 34. The positions of the other mobile terminal devices 10 are transmitted, each time the position of the first mobile terminal device 10 is received.

The first mobile terminal device 10 receives the positions of the other mobile terminal devices 10 than itself through the near-field communication unit 14, and the near-field communication unit 14 outputs the received positions to the controller 21 (S104). At this point, the controller 21 repeatedly acquires the position of the first mobile terminal device 10 on the basis of the GPS signal received by the GPS reception unit 15, and decides whether the first mobile terminal device 10 is moving, depending on the change of the position (S105). When the controller 21 decides that the first mobile terminal device 10 is not moving (NO at S105), the process returns to S103. Accordingly, when the mobile terminal device 10 is not moving, the screen of the display unit 11 of the corresponding mobile terminal device 10 is not darkened.

Upon deciding that the first mobile terminal device 10 is moving (YES at S105), the controller 21 compares the positions of the other mobile terminal devices 10 received at S104 with the position of the first mobile terminal device 10, and calculates the separation distance between the first mobile terminal device 10 and each of the other mobile terminal devices 10. Then the controller 21 selects the closest separation distance, and decides whether the closest separation distance is equal to or shorter than a predetermined threshold (e.g., 10 meters) (S106). When the controller 21 decides that the closest separation distance is longer than the threshold (NO at S106), the process returns to S103. Thus, when no other mobile terminal device 10 is within a region of a radius equal to the threshold about the first mobile terminal device 10, the screen of the display unit 11 of the first mobile terminal device 10 is not darkened.

In contrast, upon deciding that the closest separation distance is equal to or shorter than the threshold (YES at S106), the controller 21 assumes that another mobile terminal device 10, or second mobile terminal device 10, is within the region of the radius equal to the threshold about the first mobile terminal device 10, in other words the second mobile terminal device 10 is approaching. Further, the controller 21 calculates the approaching direction of the second mobile terminal device 10 toward the first mobile terminal device 10, on the basis of the position of the second mobile terminal device 10 at the closest separation distance and the position of the first mobile terminal device 10 (S107).

The controller 21 then calculates the portion to be darkened in the screen of the display unit 11, according to the closest separation distance and the approaching direction of the second mobile terminal device 10 toward the first mobile terminal device 10. The display controller 23 darkens the portion of the screen of the display unit 11 determined by the calculation (S108). Thus, the portion in the screen of the display unit 11 corresponding to the approaching direction is darkened, and the size of the darkened portion in the screen of the display unit 11 is determined according to the separation distance, as shown in FIG. 3 or FIG. 4.

Here, after the closest separation distance has become shorter than the threshold, the reception level of the signal transmitted from the second mobile terminal device 10 and received through the near-field communication unit 14 becomes higher. Therefore, the separation distance may be corrected by recalculation or adjustment according to the reception level of the signal, to thereby improve the accuracy of the separation distance. Within the communication area of the management apparatus 30, the mobile terminal devices 10 each transmit and receive the positions of the respective mobile terminal devices 10 through a common channel, and therefore the separation distance can be corrected by recalculation or adjustment according to the reception level of the signals transmitted from other mobile terminal devices 10, and received through the near-field communication unit 14. In addition, since the signal received at a high reception level from the second mobile terminal device 10 is utilized, the recalculation or adjustment is barely affected by the signals from the remaining mobile terminal devices 10 or the management apparatus 30, which are received at a lower reception level.

Thereafter, in the case where the first mobile terminal device 10 remains within the communication area of the management apparatus 30 and hence the Wi-Fi communication is continued (NO at S109), the controller 21 repeats the operation of S103 to S108, through which the controller 21 expands the darkened portion in the screen of the display unit 11 as shown in FIG. 3 or FIG. 4, when the second mobile terminal device 10 further approaches the first mobile terminal device 10 and the separation distance becomes shorter.

Figure 5:
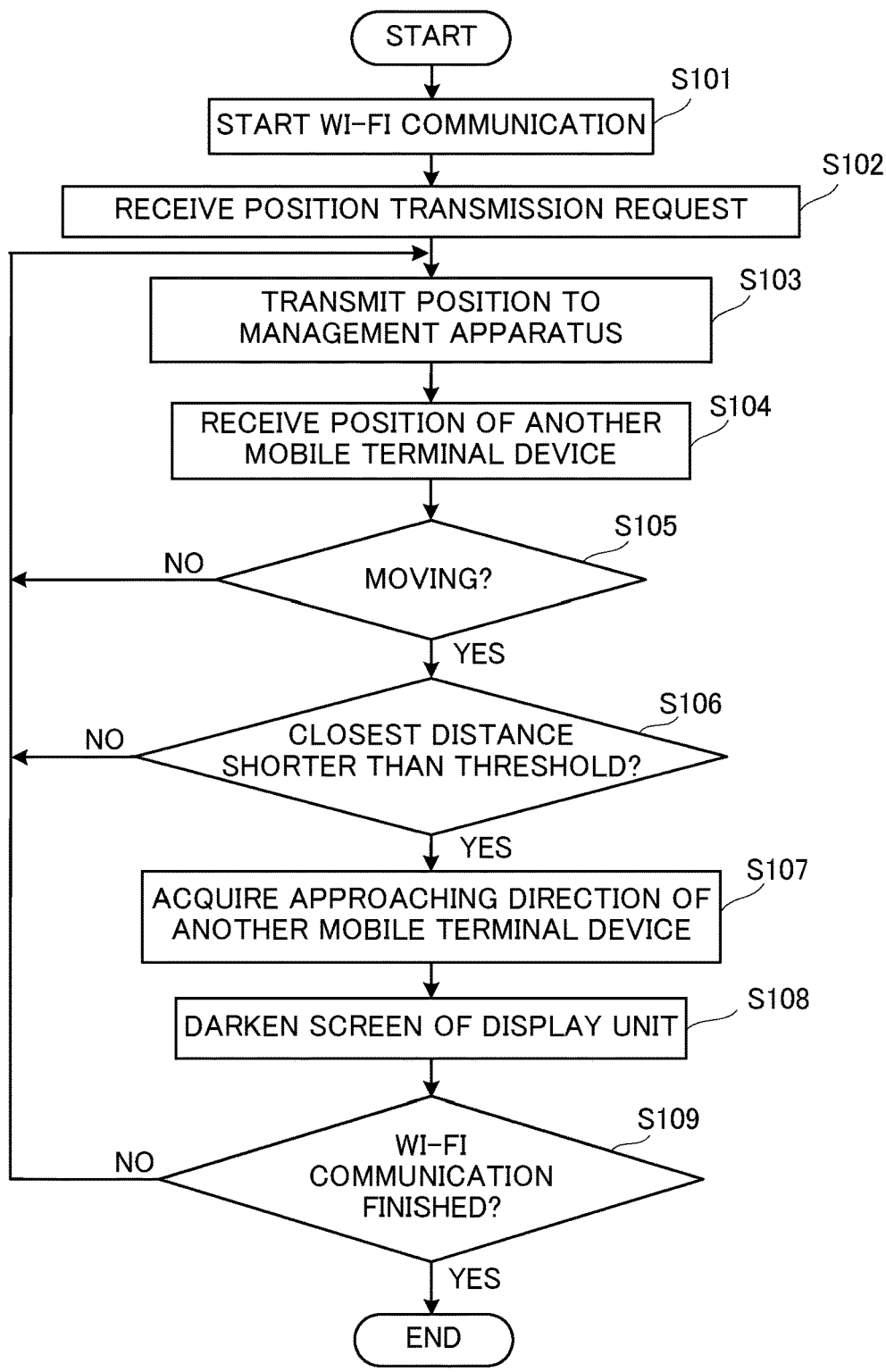
FIG. 5 is a flowchart showing a process of darkening the screen of the display unit of the mobile terminal device.

In contrast, in the case where the first mobile terminal device 10 goes out of the communication area of the management apparatus 30 and the Wi-Fi communication is finished (YES at S109), the controller 21 finishes the operation shown in FIG. 5.

In this embodiment, as described above, when the second mobile terminal device 10 approaches the first mobile terminal device 10 while the latter is moving, a part or the whole of the screen of the display unit 11 of the first mobile terminal device 10 is darkened. Accordingly, the user of the first mobile terminal device 10 can be aware that the user of the second mobile terminal device 10 is approaching, thus being led to suspend the operation, and can avoid bumping the user of the second mobile terminal device 10. Provided that no other mobile terminal device 10 is approaching, the user of the first mobile terminal device 10 can continue the operation while moving on. In addition, while the first mobile terminal device 10 is not moving, the screen of the display unit 11 is not darkened despite another mobile terminal device 10 approaching, and hence the operation can be continued. Further, darkening the screen of the display unit 11 contributes to reducing the energy consumption.

Now, with the first technique referred to in the description of the background art, the warning is displayed when the user starts to operate the terminal device while walking, in which case the warning may provoke a problem. For example, when the user is utilizing the terminal device as a navigator, the display of the warning disturbs the expected function of the navigator. In addition, although the second technique referred to in the description of the background art proposes displaying the position information of the pedestrians and vehicles in the display unit of the terminal device, the displaying method of the position information is not specified. In the case where, for example, the position information is displayed in a row of numerals, it is difficult to figure out whether the user is about to bump the user of another mobile terminal device, on the basis of the position information displayed in such a manner.

According to this embodiment, unlike the above, when the user is likely to bump the user of another mobile terminal device, the risk of the collision can be displayed in an intuitively recognizable manner.

When the separation distance between the first mobile terminal device 10 and a plurality of other mobile terminal devices 10 becomes shorter than the threshold, in other words a plurality of other mobile terminal devices 10 are approaching, one of the other mobile terminal devices 10 that has approached first is selected, and a part of the screen of the display unit 11 of the first mobile terminal device 10 is darkened, on the basis of the separation distance from the mobile terminal device 10 that has approached first, and the approaching direction thereof.

In contrast, in the case where it is decided, when the separation distance between the first mobile terminal device 10 and the second mobile terminal devices 10 becomes shorter than the threshold, in other words the second mobile terminal devices 10 is approaching, that the second mobile terminal device 10 has stopped, on the basis of the change in position of the second mobile terminal device 10, the user of the first mobile terminal device 10 is less likely to bump the user U of the second mobile terminal device 10. Therefore, the darkening of the screen of the display unit 11 may be suspended, to restore the normal luminance of the screen of the display unit 11.

Further, when the second mobile terminal device 10 is approaching, the operation of the first mobile terminal device 10 may be restricted, in addition to darkening a part of the screen of the display unit 11 of the first mobile terminal device 10. For example, the controller 21 may decide whether the area of the darkened portion in the screen has exceeded a predetermined level, and restrict the operation of the operation reception unit 22, upon deciding that the area of the darkened portion has exceeded the predetermined level. In this case, the user of the first mobile terminal device 10 can no longer operate the mobile terminal device 10, and is led to pay attention to the approach of the second mobile terminal device 10.

The disclosure is also applicable to the communication through the public telephone network, not only to the Wi-Fi communication. In this case, a server on the Internet is employed so as to act in the same way as the management apparatus 30 does, such that the server collects and manages the positions of the respective mobile terminal devices 10, to select a second mobile terminal device 10 in the vicinity of the user of a first mobile terminal device 10 on the basis of the positions of the respective mobile terminal devices 10, and transmits the position of the second mobile terminal device 10 to the first mobile terminal device 10. Thus, the first mobile terminal device 10 compares the position of itself with the position of the second mobile terminal device 10, to thereby decide whether the second mobile terminal device 10 is approaching the first mobile terminal device 10.

Figure 6:
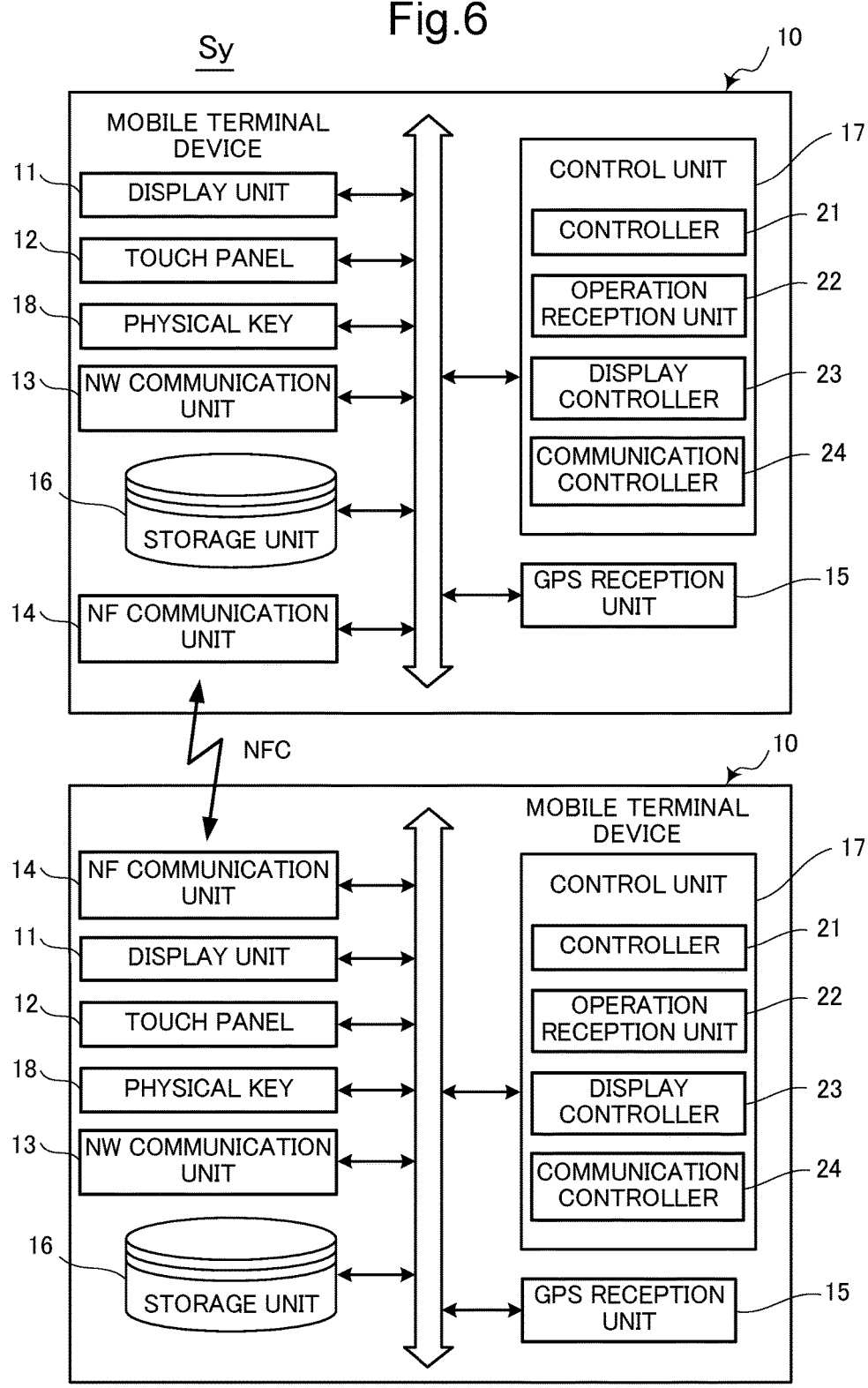
FIG. 6 is a block diagram showing a configuration of a mobile terminal device in a safety management system according to a second embodiment of the disclosure.
Figure 7:
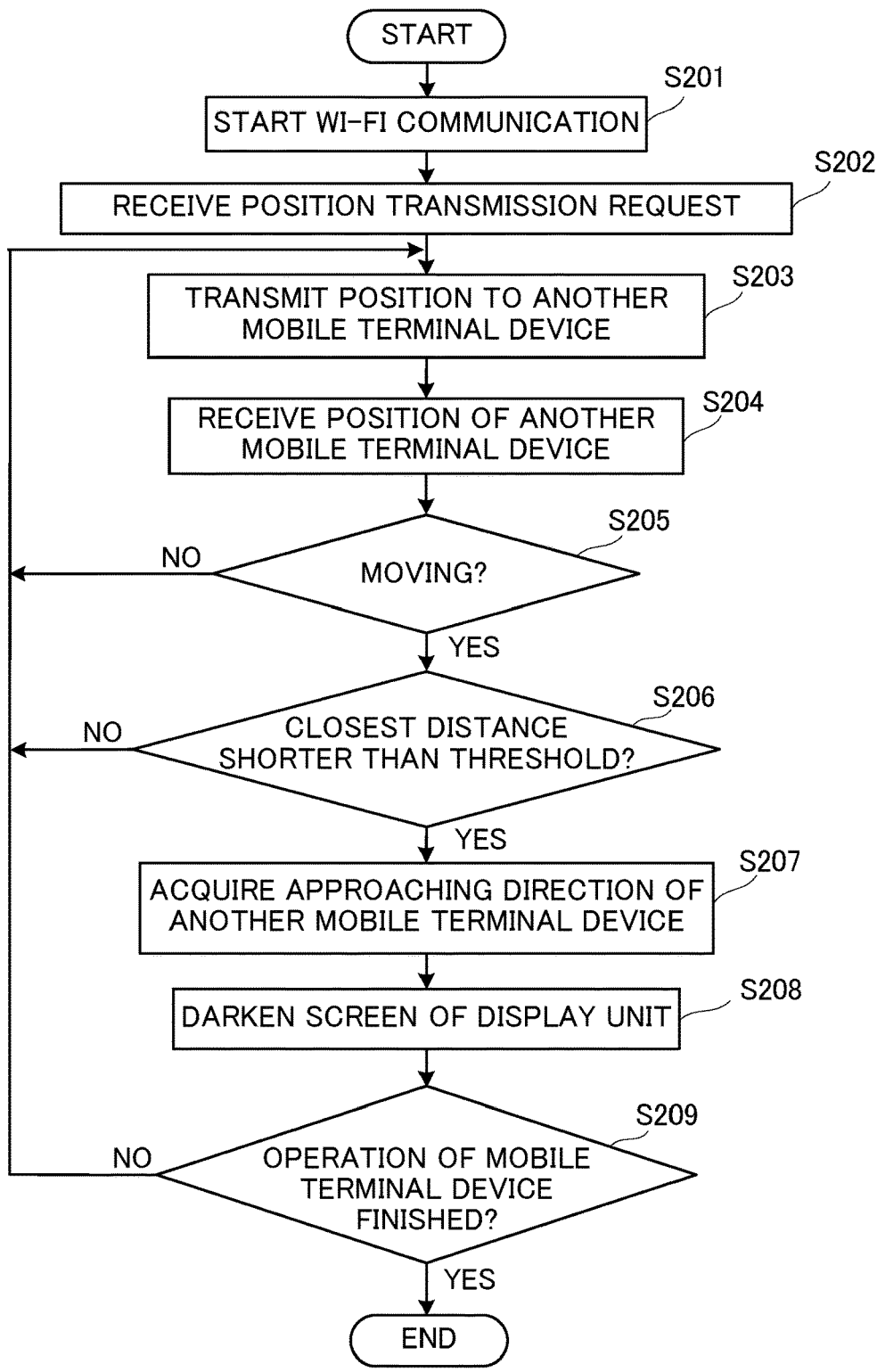
FIG. 7 is a flowchart showing a process of darkening the screen of the display unit of the mobile terminal device in the safety management system according to the second embodiment of the disclosure.

As a second embodiment, the safety management system may be configured such that the respective positions of the mobile terminal devices 10 approaching each other may be transmitted and received therebetween, to acquire the separation distance between each other on the basis of the positions of the mobile terminal devices 10, and the darkened portion in the screen of the display unit 11 of the first mobile terminal device 10 may be expanded, as the separation distance becomes shorter. FIG. 6 is a block diagram showing a configuration of a mobile terminal device in the safety management system according to the second embodiment of the disclosure. FIG. 7 is a flowchart showing a process of darkening the screen of the display unit of each of the mobile terminal devices in the safety management system, according to the second embodiment.

In the second embodiment, the safety management system Sy is composed of a plurality of mobile terminal devices 10. Here, the description of the configuration of the mobile terminal device 10, which is the same as that of the first embodiment, will not be repeated.

The plurality of mobile terminal devices 10, constituting the safety management system Sy according to this embodiment, each execute the operation shown in FIG. 7. The controller 21 continuously activates the GPS reception unit 15 while the mobile terminal device 10 is in operation, to receive the GPS signal from the GPS reception unit 15 thus to acquire the position of the mobile terminal device 10. The communication controller 24 transmits the acquired position through the near-field communication unit 14, to other mobile terminal devices 10 located within the communication range of the near-field communication unit 14, for example together with the identifier of the mobile terminal device 10, which, though, is not mandatory (S203). In other words, while in operation, the mobile terminal device 10 periodically acquires the own position and transmits the position to the other mobile terminal devices 10 through the near-field communication unit 34, and receives, from the other mobile terminal devices 10, the respective positions of those mobile terminal devices 10 through the near-field communication unit 14.

In each of the mobile terminal devices 10, upon receipt of the positions of the other mobile terminal devices 10, the near-field communication unit 14 outputs the positions to the controller 21 (S204). Thereafter, the operations of S205 to 208 performed by the mobile terminal device 10, namely the decision whether the mobile terminal device 10 is moving (S205), the decision whether the closest separation distance is equal to or shorter than the threshold (S206), the calculation of the approaching direction of another mobile terminal device 10 (S207), and the darkening of the screen of the display unit (S208), are executed in the same way as in the first embodiment, described with reference to FIG. 5.

When the mobile terminal device 10 is still in operation after S208 (NO at S209), the operations of S203 to S208 are repeated. When the mobile terminal device 10 stops operating, for example by turning the power off (YES at S209), the operation shown in FIG. 7 is finished.

The arrangement according to this embodiment also allows the mobile terminal device 10 to display the risk of the collision in an intuitively recognizable manner, when the user of the mobile terminal device 10 is likely to bump the user of another mobile terminal device 10.

As a third embodiment, in the case where the mobile terminal device 10 includes an acceleration sensor in the operations shown in FIG. 5 and FIG. 7, the acceleration of the mobile terminal device 10 may be detected, and the respective positions and acceleration values may be transmitted and received between the mobile terminal devices 10 approaching each other. Then, not only the separation distance, a closing rate between the mobile terminal devices 10 may be acquired on the basis of the acceleration, and the closing rate may be utilized to determine the size of the darkened portion in the screen of the display unit 11. For example, the darkened portion in the display unit 11 may be expanded at a rate corresponding to the closing rate acquired as above. Further, in the case where the mobile terminal device 10 includes a vibrator, the vibrator may be activated at the same time as darkening the screen of the display unit 11. Such an arrangement further facilitates the user to recognize the approach of the user of another mobile terminal device 10.

The display control method referred to in the foregoing embodiments may be provided in the form of a program. The program may be recorded on a non-transitory computer-readable recording medium, such as a hard disk, a CD-ROM, a DVD-ROM, or a semiconductor memory. In this case, the non-transitory computer-readable recording medium, having the program recorded thereon, constitutes another embodiment of the disclosure.

While the present disclosure has been described in detail with reference to the embodiments thereof, it would be apparent to those skilled in the art the various changes and modifications may be made therein within the scope defined by the appended claims.

What is claimed is:

1. A portable mobile terminal device comprising:
   a display unit;
   an operation unit to be operated by a user;
   a position detection unit that detects a position of the mobile terminal device;
   a communication unit that makes communication with another mobile terminal device; and
   a controller that decides whether the another mobile terminal device is approaching the mobile terminal device on a basis of a position of the another mobile terminal device received by the communication unit, and the position of the mobile terminal device detected by the position detection unit, and darkens a part or whole of a screen of the display unit, upon deciding that the another mobile terminal device is approaching.

2. The mobile terminal device according to claim 1, wherein the controller calculates a separation distance between the another mobile terminal device and the mobile terminal device, on a basis of the position of the another mobile terminal device and the position of the mobile terminal device, and expands, when darkening a part of the screen, a size of the darkened part in the screen of the display unit as the separation distance becomes shorter.

3. The mobile terminal device according to claim 2, wherein the communication unit receives a signal transmitted from the another mobile terminal device, and the controller corrects the separation distance according to a reception output of the communication unit receiving the transmitted signal.

4. The mobile terminal device according to claim 1, wherein the controller decides an approaching direction of the another mobile terminal device toward the mobile terminal device, on a basis of the position of the another mobile terminal device and the position of the mobile terminal device, and darkens the screen of the display unit from a portion corresponding to the approaching direction.

5. The mobile terminal device according to claim 1, wherein the controller decides whether the mobile terminal device is moving, on a basis of a change of the position of the mobile terminal device detected by the position detection unit, darkens a part or whole of the screen of the display unit when the mobile terminal device is moving, and maintains the screen of the display unit as it is, when the mobile terminal device is not moving.

6. The mobile terminal device according to claim 1, wherein the controller restricts the operation unit from being operated by the user, upon deciding that the another mobile terminal device is approaching.

7. The mobile terminal device according to claim 1, wherein, upon deciding that a plurality of other mobile terminal devices are approaching the mobile terminal device, on a basis of a position of each of the plurality of other mobile terminal devices and the position of the mobile terminal device, the controller darkens a part or whole of the screen of the display unit, according to a decision regarding one of the other mobile terminal devices that has approached first.

8. The mobile terminal device according to claim 1, wherein the controller decides, after deciding that the another mobile terminal device is approaching and darkening the screen of the display unit, whether the another mobile terminal device has stopped on a basis of a change of the position of the another mobile terminal device, and restores an original luminance of the part or whole of the screen of the display unit, upon deciding that the another mobile terminal device has stopped.

9. The mobile terminal device according to claim 1, wherein the controller transmits the position of the mobile terminal device detected by the position detection unit to the another mobile terminal device, through the communication unit.

10. The mobile terminal device according to claim 1, further comprising an acceleration sensor,
    wherein the another mobile terminal device also includes the acceleration sensor, and
    the controller further calculates a closing rate between the another mobile terminal device and the mobile terminal device, on a basis of an acceleration of the another mobile terminal device received through the communication unit and an acceleration of the mobile terminal device detected by the acceleration sensor, and expands a size of the darkened part in the display unit, at a rate corresponding to the calculated closing rate.

11. The mobile terminal device according to claim 1, further comprising a vibrator,
    wherein the controller activates the vibrator while darkening the screen of the display unit.

12. A safety management system comprising:
    a plurality of portable mobile terminal devices; and
    a management apparatus that makes communication with each of the plurality of mobile terminal devices,
    wherein the management apparatus acquires, from each of the mobile terminal devices, a position of the corresponding mobile terminal device, and transmits the position to each of the mobile terminal devices, and
    the mobile terminal devices each include:
    a display unit,
    an operation unit to be operated by a user,
    a position detection unit that detects an own position of the mobile terminal device,
    a communication unit that makes communication with another mobile terminal device, and
    a controller that decides whether the another mobile terminal device is approaching the mobile terminal device on a basis of a position of the another mobile terminal device received by the communication unit, and the position of the mobile terminal device detected by the position detection unit, and darkens a part or whole of a screen of the display unit, upon deciding that the another mobile terminal device is approaching.

* * * * *